United States Patent [19]
Trinh et al.

[11] 3,916,087
[45] Oct. 28, 1975

[54] BUNDLE-LIKE EXPANDED CONDUCTORS

[75] Inventors: Ngoe Giao Trinh; P. Sarma Maruvada, both of Boucherville, Canada

[73] Assignee: Institut de Recherche de L'Hydro-Quebec, Varennes, Canada

[22] Filed: Aug. 22, 1974

[21] Appl. No.: 499,525

[52] U.S. Cl.............. 174/128; 174/40 R; 174/146
[51] Int. Cl.[2] ...................... H02G 7/12; H01B 5/00
[58] Field of Search...... 174/40 R, 127, 128, 129 R, 174/146, 149 R; 307/147, 148

[56] References Cited
UNITED STATES PATENTS

| | | | |
|---|---|---|---|
| 1,078,711 | 11/1913 | Whitehead | 307/147 |
| 1,190,135 | 7/1916 | Faccioli | 174/127 |
| 2,953,624 | 9/1960 | Perrone et al. | 174/40 R |
| 3,157,731 | 11/1964 | Torr | 174/40 R |
| 3,263,021 | 7/1966 | Caunt | 174/146 X |
| 3,270,123 | 8/1966 | Short | 174/128 |

FOREIGN PATENTS OR APPLICATIONS

| | | | |
|---|---|---|---|
| 53,420 | 1/1934 | Norway | 174/146 |

OTHER PUBLICATIONS

*Electrical World,* "Space–Age Spacers," Dec. 1, 1972, pp. 66 and 67.

*Primary Examiner*—Laramie E. Askin

[57] ABSTRACT

The invention concerns a bundle-like expanded conductor for EHV and UHV transmission lines. This conductor comprises a plurality of spaced subconductors mounted symmetrically about the longitudinal axis of the conductor. The spacing between any two adjacent subconductors is equal to or less than 7 times the diameter of one subconductor. This bundle-like expanded conductor reduces the ice load on the line significantly, particularly that due to hard rime which occurs frequently in mountainous regions, and permits an increase of the power transmission capability of the line and a reduction of the electric field at the surface of the conductor comparatively to an equivalent single stranded conductor or an expanded conductor. A spacer required to maintain firmly all the subconductors in a relative position is also described.

7 Claims, 5 Drawing Figures

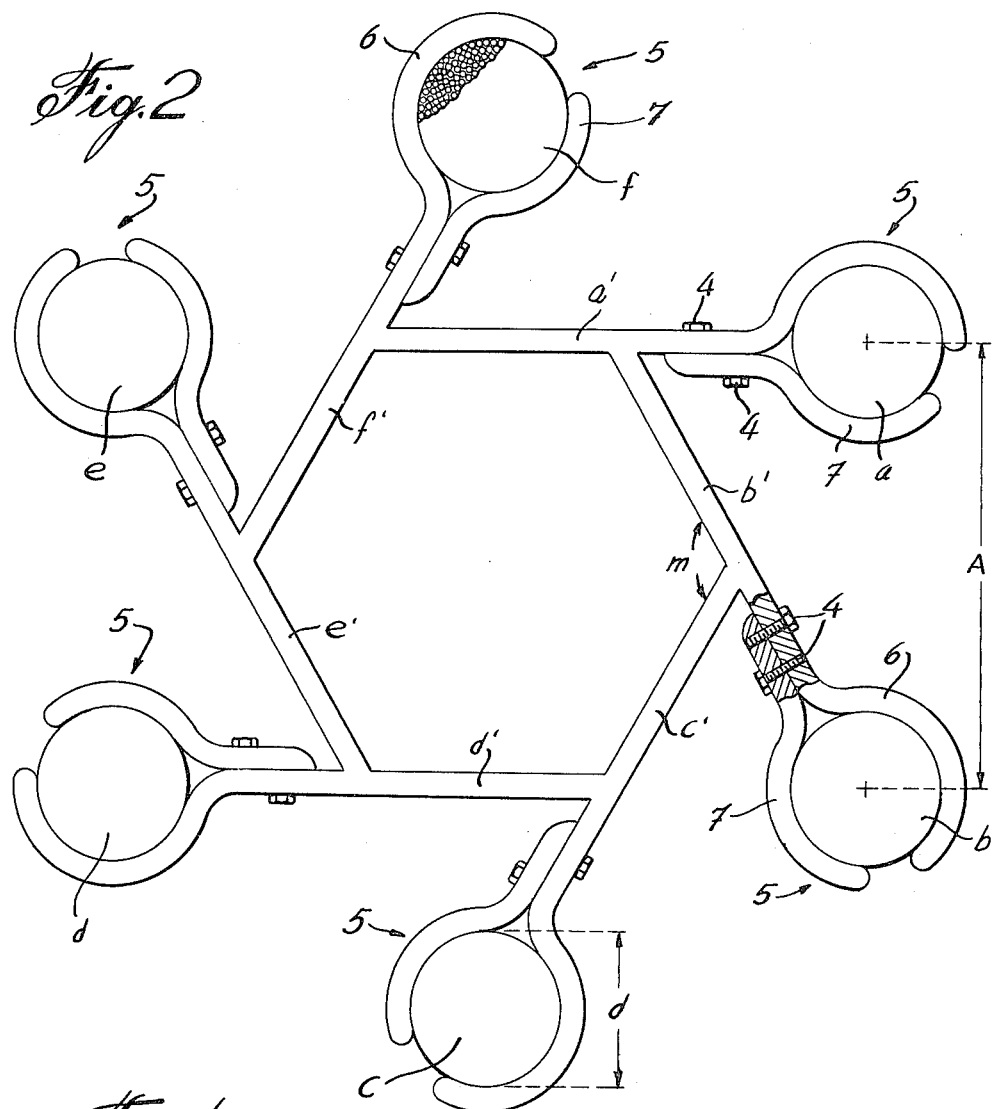
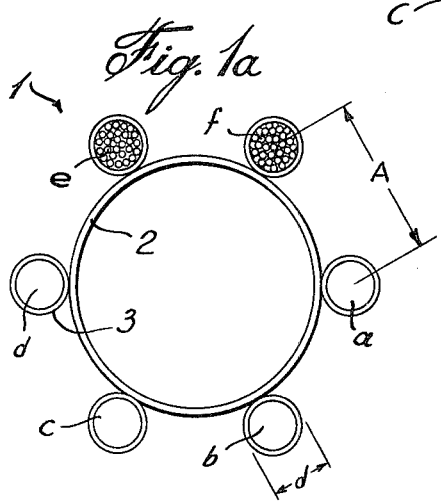
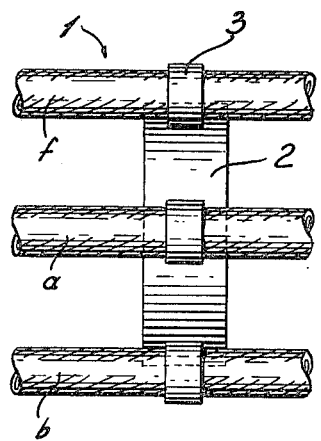

BUNDLE-LIKE EXPANDED CONDUCTORS

The present invention relates to a bundle-like expanded conductor for EHV and UHV transmission lines.

With the increasing need of electric power since the beginning of the century, both the length and the voltage level of transmission lines have been increasing steadily. It became progressively more difficult, with the lines having one conductor per phase only, to maintain the conductor surface gradient, and consequently the corona performance of the line, at acceptable levels.

An increase in the line voltage implies a corresponding increase of the conductor size and a proportional reduction of the current density in the line conductors. To overcome these problems, hollow expanded conductors of various designs have been developed and tested on the 220-kV Rheinish-Westfalisches Elektrizitatswerk line in Germany in the early 20s.

The expanded conductors were introduced in an effort to reduce the electric field at the conductor surface for transmission lines using a single conductor per phase. Several types of expanded conductors were proposed constituted, in general, of several conductive strands peripherally disposed so as to leave an empty space in the interior of the conductor. Other versions of that self-supporting hollow conductor consisted in providing an inner spiral support or in filling the empty space with plastic material for mechanically reinforcing the conductor.

However, because of their large diameter, expanded conductors present poor corona performance, are cumbersome to transport as well as to install and, over a long period of time, have a tendency to collapse.

The numerous mechanical difficulties encountered together with the development of bundle conductors such as described in U.S. Pat. No. 1,078,711 issued on Nov. 18, 1913, to Whitehead have, however, prevented further application of expanded conductors in transmission line design.

Two main advantages can be associated with bundle conductors: (1) they increase significantly the natural power transmission capability of the line, and (2) they reduce effectively the electric field at the surface of the conductors.

During the last decade, however, the collapse of several transmission lines in mountainous regions due to ice on conductors has thrown some doubts on the efficiency of bundle conductors in these particular situations. The problem is generally related to the heavy icing on line conductors following a long period of exposure to humid clouds carrying supercooled water droplets. With conventional bundle conductors, the distances separating two sub-conductors are generally greater than the diameter of ice accumulation. Each sub-conductor of the bundle therefore accumulates an equal amount of ice, resulting in the most severe ice loading conditions and in the subsequent collapse of the line.

Much work has been done in order to understand the process of ice formation. A typical kind of ice formation produces an appreciable mechanical load on the conductors, namely the rime.

Rime is due to supercooled droplets of water carried by low clouds in mountainous regions. In the case of very low termperatures and moderate winds, light rime is formed. On impact upon the conductor, each droplet freezes almost instantaneously (time $t$) before the next droplet arrives (time $\epsilon$). The ice deposit becomes white, opaque, granular, and has a density of $\delta < 0.6$ g/cm$^3$. The adhesion to the conductor is rather weak. At first, the formation is unilateral; gradually, due to the mechanical unbalance of the conductor, it spreads more evenly around the conductor. The ice load, in this case, is generally not dangerous to the line conductors.

When the temperature is in the neighbourhood of the freezing point, but the winds are violent, hard rime is formed. The freezing of each water droplet is, in this case, rather slow ($\approx \epsilon$). The ice deposit appears alternately clear and opaque with a very strong adhesion to the conductor. The density of hard rime is rather high, varying between 0.6 and 0.9 g/cm$^3$. The formation of hard rime, when the conductors are exposed to humid clouds over a long period of time, is particularly dangerous to line conductors because of the extreme additional weight of the ice.

But, with the conventional bundle conductors, each of the $n$ conductors of the bundle accumulates an ice load equivalent to several times its weight. Under these conditions, the conductors might be broken, leading to the collapse of the line. If a single conductor having an equivalent cross section as that of a bundle conductor were used, icing would be identical as for a subconductor of the bundle. The ice load would be n times smaller and the collapse of the line would be avoided.

A prime object of the invention consists in providing a conductor of the bundle type which substantially reduces the risk of collapse due to heavy icing. This is achieved by increasing the number of subconductors, while at the same time reducing the spacing between adjacent subconductors, which gives rise to roughly a proportional decrease in ice load on the transmission line without affecting its electrical performance.

Another object of the present invention, consists in providing a conductor which takes advantage of the basic principle of expanded conductors by concentrating the mass of metal of such a conductor into small conductors distributed along a circumference comparable to the external conductive layer of a conventional expanded conductor.

A further object of the invention resides in providing a conductor made up of several subconductors which are mounted according to a predetermined $A/d$ ratio, this ratio being small enough so as to eliminate vibrational problems as well as icing problems usual with conventional bundle conductors.

A supplemental object of the invention is to provide a conductor which limits radio interference and audible noise to acceptable levels.

An additional object is to provide a spacer capable of firmly mounting a substantial number of subconductors.

Accordingly, the invention consists of a bundle-like expanded conductor for EHV and UHV transmission lines which comprises a plurality of spaced subconductors mounted substantially symmetrically about a longitudinal axis. The spacing between any two adjacent subconductors is at the most 7 times larger than the diameter of one conductor. This bundle-like expanded conductor reduces the ice load on the line significantly, particularly that due to hard rime, which occurs frequently in mountainous regions, and permits an increase of the power transmission capability of the line and a reduction of the electric field at the surface of the conductor comparatively to an equivalent single stranded conductor or an expanded conductor.

The above objects and other objects and purposes will become apparent through the following description of a preferred embodiment of the present invention given with reference to the accompanying drawings, wherein FIGS. 1a and 1b are a cross-sectional view and a longitudinal view, respectively, of a bundle-like expanded conductor in accordance with the present invention;

FIG. 2 illustrates a spacer especially adapted for mounting the conductor shown in FIG. 1;

Figure 3:
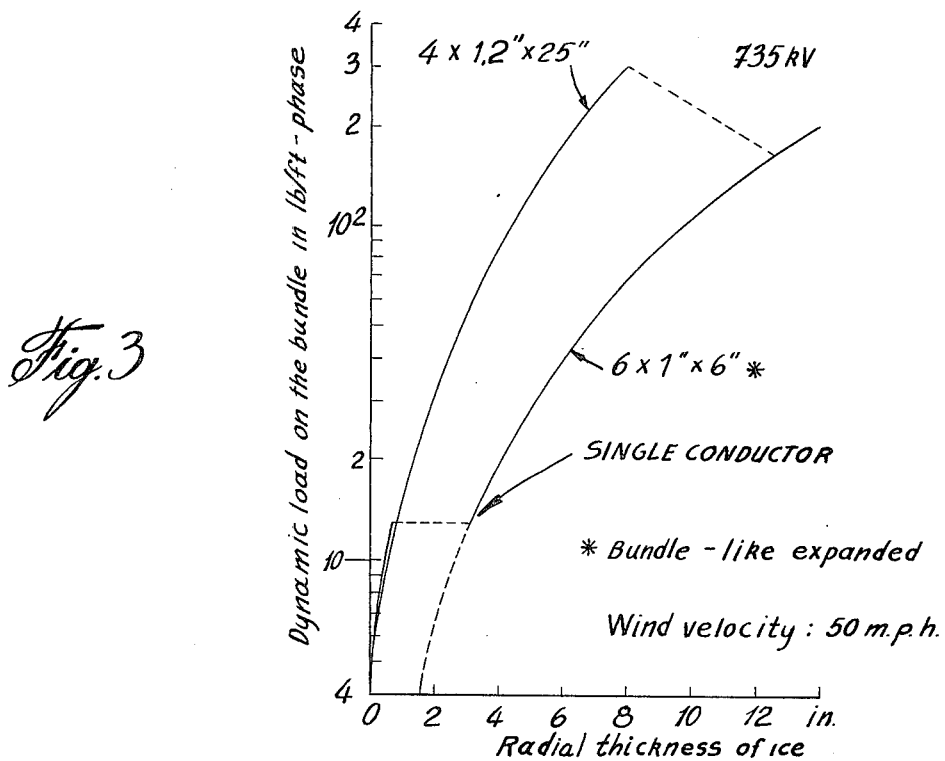
FIGS. 3 and 4 are comparative graphs showing the ice load on 735kV and 1,100kV line conductors, respectively.

FIG. 1a is a cross-sectional view of a bundle-like expanded conductor 1 in accordance with the present invention whereas FIG. 1b is a longitudinal view of such conductor. A plurality of spaced subconductors $a, b, c \ldots f$ are mounted substantially symmetrically about the longitudinal axis of the conductor. A spacer 2 provided with clamping means 3 firmly holds each of the subconductors into relative position with respect to each other. Those subconductors are so distributed around the spacer in a circular configuration which has the advantages of the conventional bundle conductors, that is an increase in the current-carrying capacity and a substantial reduction of the electric field at the surface of the conductor for EHV and UHV power transmission lines.

The use of a plurality of subconductors allows the transmission of potential up to 1,100kV and even more in an easy fashion since each individual subconductor of the stranded type, for instance, is readily available on the market. To obtain a good surface gradient and consequently acceptable corona performance of the line, the number and size of the subconductors should be chosen as a function of the line voltage. Furthermore as with a conventional expanded conductor, the total mass of metal of the subconductors can be optimized with respect to the current to be carried by the line conductor for the best use of the mass of metal of the subconductor.

The bundle-like expanded conductor of the invention is remarkable in that it also combines the advantages of a conventional bundle conductor since it allows a significant increase in the natural power transmission capability of the line and an effective reduction of the electric field at the surface of the conductor.

Furthermore, an added feature of the bundle-like expanded conductor consists in a substantial reduction in the dynamic load of ice on the transmission line. This is achieved by carefully selecting the ratio of the spacing "A" taken between any two subconductors and of the diameter $d$ of one subconductor, the spacing A being taken from the center of a subconductor to the center of the adjacent one as indicated in FIG. 1a.

It has been found that a drastic decrease of the load of ice as well as a retaining of the electrical performances of the line are obtained by choosing the parameter $A/d$ much below the optimal value used till now, and by using a larger number of subconductors than with a conventional bundle. Indeed, the reduced $A/d$ ratio makes the bundle behave almost like a single conductor with respect to icing, while the increased number of subconductors gives an acceptable corona performance.

A spacing -to- diameter ratio which is not greater than 7 has been found as a basic condition for realizing the conductor of the invention having the above-discussed properties and characteristics.

Although FIG. 1a shows a bundle-like expanded conductor constituted of 6 subconductors, this number is by no means a restricting factor in the construction of the conductor in accordance with the present invention. Indeed, the desired power transmission capacity of the line and above all the characterizing spacing -to- diameter ratio, which has to be at the most equal to 7, determine such number of subconductors used. In fact, hereinafter, bundle-like expanded conductors having various numbers of subconductors of different diameters are called for. In any instance, the arrangement of the subconductors whatever their number may be is as shown in FIG. 1a and their $A/d$ ratio equals or is lower than 7.

FIG. 2 illustrates a rigid spacer suitably adapted for mounting the bundle-like expanded conductor in accordance with the present invention. This spacer is constituted of as many arms $a', b', c' \ldots f'$ as there are subconductors in the bundle. The arms should be made of a metallic material, since all the subconductors are equipotential, and should have a circular or rectangular cross-section. One end of an arm is firmly attached to the main part of the immediately preceding arm such as by welding in such a manner that the internal angle $m$ made by any 2 thus assembled adjacent arms is the same. A polygon-shaped figure having equal sides is thereby formed. Each free end of the arms holds a subconductor by means of a two-piece jaw type holder 5, one piece 6 being an integral part of the arm and semi-circularly shaped while the other piece 7 is removable and comprises an elongated portion and a rounded portion. The radius of curvature of both pieces is preferably that of the subconductor held in the holder. After insertion of a subconductor into the first piece 6, the second piece 7 is set into place and firmly bound to the arm through its elongated portion by means of fasteners such as bolts indicated at 4. The holder of FIG. 2 allows the assembly of the bundle-like expanded conductor of the invention with a minimum of time and a quick replacing of any defective spacer located along the transmission line.

As mentioned above, the new bundle-like expanded conductor of the invention is particularly effective in reducing the dynamic load of ice on a transmission line. It is to be said that since the icing process is not influenced by the shape of the conductor, the ice accumulation on the bundle-like expanded conductor becomes equivalent to the case of a single conductor for ice accumulation exceeding its overall diameter. Typical ice loads plotted for several bundle-like expanded conductors configurations, as a function of the ice accumulation, are presented in FIGS. 3 and 4, for the cases of 735kV and 1,100kV lines respectively.

Figure 4:
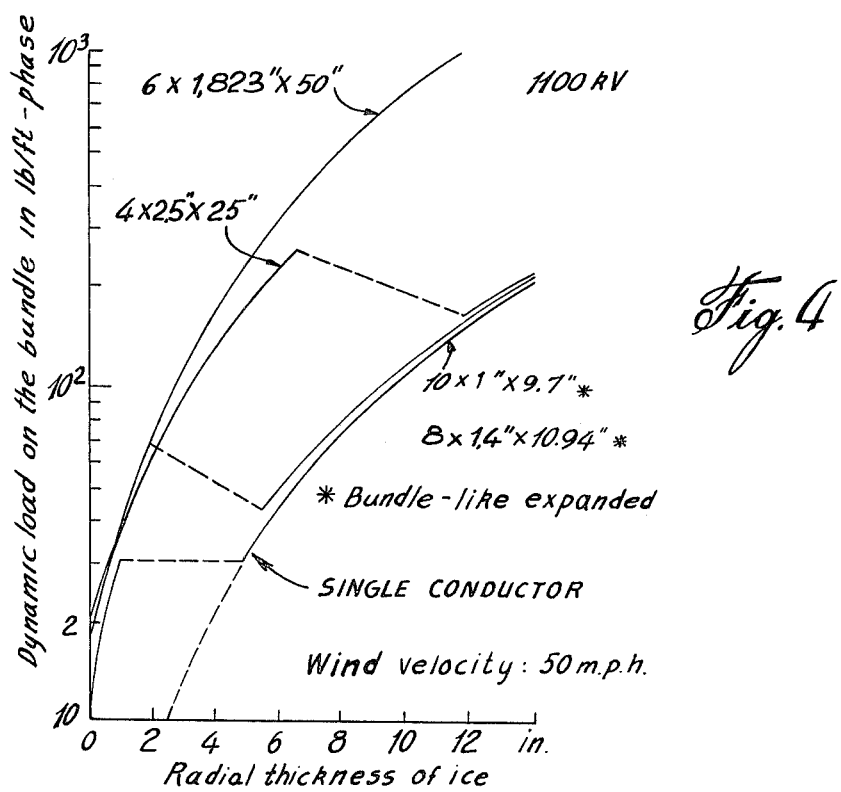

From the curves shown in FIGS. 3 and 4, it can be seen that for light ice accumulation, that is for a small radial thickness of ice, the new bundle-like expanded conductor behaves like a conventional bundle conductor, with each subconductor accumulating an equal amount of ice. But, as the ice accumulation grows larger than the bundle diameter, its ice accumulation efficiency drops to that of a single conductor. Also, for ice accumulation greater than the subconductor spacing, but still smaller than the bundle diameter, the ice accumulation process is represented by dotted lines.

By properly selecting the bundle-like expanded conductor, the ice load can be kept to a minimum for the most severe icing condition. Compared to conventional bundles, the new concept of bundle-like expanded conductors allows a reduction in the ice load of up to 75–80percent, under heavy icing conditions.

In the following, we would like to compare the electrical performance of the bundle-like expanded conductor with that of conventional conductors bundles for transmission voltage levels of 735kV and 1,100kV.

Tables I and II show results of the comparative electrical performances of several conductor bundles. The bundle-like expanded conductor of the invention is marked with an asterisk.

inches and 10 × 1 inches) give RI and AN performances comparable to that of the normal 6 × 1.823 inches bundle, but offer a definitely better solution in regions of heavy icing.

It is also observed from the tables that the natural power transmission capability of the lines is reduced by 20 to 30 percent lower for the bundle-like expanded conductors than for conventional bundle conductors. In the case of 735kV lines, which usually operate at 60–100 percent of natural power, this has either a marginal or no effect at all on the line performance. Such a decrease is of even less importance in the case of 1,100kV lines.

From above, it becomes obvious that the use of con-

TABLE I

Comparative electrical performance of conductor bundles for 735kV lines.

| Conductor bundle | Subconductor spacing, in. | Maximum conductor surface gradient $E_m$, kV$_{rms}$/cm | Corona onset gradient $E_c$, kV$_{rms}$/cm | $E_m/E_c$ | RI at 100' from outside phase, heavy rain dB above $\mu$v/m | AN at 100' from outside phase, heavy rain dB (A) above $2 \times 10^{-5}$ N/m$^2$ | Natural power of the line MW |
|---|---|---|---|---|---|---|---|
| 4 × 1.196" | 18 | 19.76 | 26.34 | 0.75 | 68.7 | 56.7 | 2097 |
| 2 × 2.5" | 18 | 16.43 | 24.78 | 0.66 | 78.7 | 62.0 | 1852 |
| *6 × 1.0" | 3 | 20.27 | 26.86 | 0.75 | 65.3 | 58.4 | 1692 |

TABLE II

Comparative electrical performance of conductor bundles for 1,100kV lines

| Conductor bundle | Subconductor spacing, in. | Maximum conductor surface gradient $E_m$, kV$_{rms}$/cm | Corona onset gradient $E_c$, kV$_{rms}$/cm | $E_m/E_c$ dB above $\mu$v/m | RI at 100' from outside phase, heavy rain dB(A) above | AN at 100' from outside phase, heavy rain MW $2 \times 10^{+5}$ N/m$^2$ | Natural power of the line |
|---|---|---|---|---|---|---|---|
| 6 × 1.823 | 25 | 15.72 | 25.39 | 0.62 | 68.1 | 61.0 | 5455 |
| 4 × 2.5" | 18 | 15.69 | 24.78 | 0.63 | 77.2 | 65.7 | 4683 |
| *8 × 1.4" | 4.2 | 18.27 | 27.0 | 0.68 | 68.2 | 63.5 | 4068 |
| *10 × 1" | 3 | 20.53 | 26.86 | 0.76 | 67.5 | 62.7 | 3970 |

In the table, the maximum conductor surface gradient, which occurs on the center phase of the line, is shown in the third column, while the corona onset gradient $E_c$ is shown in the fourth column. The ratio $E_m/E_c$ shown in the next column varies generally between 0.6 to 0.8 for practical transmission line designs. On the other hand, the radio interference (RI) and audio noise (AN) levels of the lines have been determined under heavy artificial rain conditions. The last column of the tables shows the natural power transmission capability of the line.

Referring to table I, the 4 × 1.196 inches bundle (a bundle using four subconductors each having a diameter of 1.196 inches) having a subconductor spacing of 18 inches has been used on the 735kV lines of Hydro-Quebec and elsewhere, and has been found satisfactory from electrical performance considerations. However, the bundle with a reduced number of subconductors, namely the 2 × 2.5 inches bundle with a subconductor spacing of 18 inches, shows a 10dB increase in RI and a 5.3dB increase in AN, and therefore cannot be suitable from the point of view of corona performance. Conversely, the 6 × 1.0 inches bundle-like expanded conductor gives a substantially better corona performance than the conventional 4 × 1.196 inches bundle, and substantially acceptable AN and RI levels.

Referring to table II, the 6 × 1.823 inches bundle having a subconductor spacing of 25 inches has been suggested for use on future 1,100kV lines. However, the two bundle-like expanded conductors (8 × 1.4 ventional bundle conductors or even a bundle using a smaller number of conventional expanded conductors in mountaneous regions may give rise to excessive ice loads and transmission lines. The bundle-like expanded conductor of the invention eliminates the disadvantages of conventional conductors by drastically reducing the load of ice on the lines and thus prevents their collapse especially during hard rime icing. Moreover, the bundle-like expanded conductor does not increase the volume of metal required and is realized so as to meet the corona performance requirement for operation of the line in EHV as well as UHV ranges. Moreover, because of the low value of the A/d ratio used, the bundle-like expanded conductor is more stable than conventional bundle conductors with regard to mechanical vibrations induced by the wind.

We claim:

1. Bundle-like expanded conductor for EHV and UHV transmission lines, in regions where the risk of heavy in-cloud icing is high, comprising a plurality of subconductors assembled symmetrically with respect to the longitudinal axis of said conductor, each of said subconductors being spaced from an immediately adjacent subconductor by a distance at the very most equal to 7 times the diameter of said subconductor, and means supporting said subconductors, said means keeping each of said subconductors at said relative distance.

2. Bundle-like expanded conductor as claimed in claim 1, characterized in that the total volume of the metal constituting said subconductors is equal to the volume constituting the external conductive layer of a typical expanded conductor.

3. Bundle-like expanded conductor as claimed in claim 1, characterized in that the support means are spacers, each of said spacers being constituted of as many arms as there are subconductors.

4. Bundle-like expanded conductor as claimed in claim 3, characterized in that each of said arms has one extremity firmly fixed to the central part of the immediately preceding arm, the other extremity holding one subconductor.

5. Bundle-like expanded conductor as claimed in claim 4, characterized in that each said extremity holding one subconductor is made of two semi-circular elements, a first element being an integral part of the arm whereas the second element is removable and comprises an elongated portion and a rounded portion, and means firmly mounting said elongated portion of the second element onto said arm.

6. Bundle-like expanded conductor as claimed in claim 4, characterized in that the angle made between any two adjacent arms is the same.

7. Bundle like expanded conductor for EHV and UHV transmission lines, useful in reducing the load of ice on said lines in regions where heavy in-cloud icing occurs, comprising a plurality of subconductors symmetrically disposed with respect to the longitudinal axis of said conductor and having a total volume of metal equal to the volume constituting the external conductive layer of an expanded conductor of known type, any two immediately adjacent subconductors being mounted according to a ratio of the spacing between said any two adjacent subconductors and of the diameter of one subconductor equal to or less than 7, supporting and spacing means maintaining said subconductors within the limit values of said ratio.

* * * * *